No. 668,367. Patented Feb. 19, 1901.
G. A. W. BARKOWSKY.
SELF IGNITING BODY AND METHOD OF MAKING SAME.
(Application filed Sept. 6, 1900.)
(No Model.)
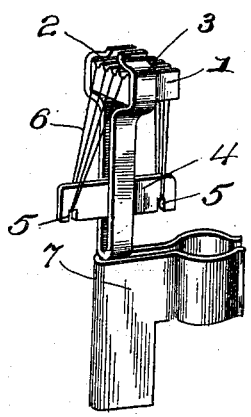
Witnesses.
Allan H. Foose.
Walter Tamaris
Inventor.
Gustav A. W. Barkowsky
By Kay & Totten
Attorneys.

UNITED STATES PATENT OFFICE.

GUSTAV ADOLF W. BARKOWSKY, OF ALLEGHENY, PENNSYLVANIA, ASSIGNOR OF ONE-HALF TO ROBERT E. WILSON, OF SAME PLACE.

SELF-IGNITING BODY AND METHOD OF MAKING SAME.

SPECIFICATION forming part of Letters Patent No. 668,367, dated February 19, 1901.

Application filed September 6, 1900. Serial No. 29,143. (No specimens.)

*To all whom it may concern:*

Be it known that I, GUSTAV ADOLF W. BARKOWSKY, a resident of Allegheny, in the county of Allegheny and State of Pennsylvania, have invented a new and useful Improvement in Self-lgniting Bodies and Methods of Making the Same; and I do hereby declare the following to be a full, clear, and exact description thereof.

My invention relates to self-igniting bodies for gas-jets and to the method of making the same, and has for its object the provision of a self-igniting body which is much more reliable and rapid in its action than igniting-bodies heretofore in use.

The accompanying drawing shows in perspective view the self-igniting body and preferred manner of mounting the same.

In the manufacture of self-igniting bodies according to the most common methods heretofore employed a porous body, preferably meerschaum, is freed from its soluble ingredients, then treated with various chemical solutions, one of which usually is a solution of platinum salt, and then suitably forming and mounting such body. I have found, however, that in order to secure a good self-igniting body it is not correct to entirely free the meerschaum from the soluble ingredients contained therein. Meerschaum, as is well known, is composed of silica, magnesia, carbonic-acid gas, and a small amount of hygroscopic water. Most meerschaums, however, are not developed completely—that is, in the process of formation certain ingredients have not been present in sufficient quantities—so that meerschaum is usually deficient in silicic acid, a defect which is not noticeable in the ordinary uses to which meerschaum is put, but which I have found to be a detriment when the meerschaum is used as a gas-igniting body.

According to my invention I do not free the meerschaum from the soluble elements contained therein; but I first give the meerschaum a short immersion in ordinary commercially pure silicic acid in order to supply the deficiency of this element therein. The meerschaum is then allowed to dry and is then lixiviated or washed in hot water to remove the excess of silicic acid. It is then dried and either immersed in or exposed to the vapors of ordinary ether, and after it is dry it is immersed in a solution of platinum hydrogen chlorid,

$$(H_2PtCl_6 + 6H_2O = PtCl_4. \quad 2HCl + 6H_2O.)$$

It is then allowed to dry and is exposed for a short time to a current of natural gas at ordinary temperature, the effect of which is to reduce the platinum hydrogen chlorid and also supplies the body with carbon, thereby making it light and porous. It should then be again immersed in the platinum hydrogen chlorid, as before, and again dried and exposed to the current of natural gas, and this process may be repeated, if found necessary, as may be the case if a weak solution of the chemical is used; but two immersions in the platinum hydrogen chlorid are generally sufficient to thoroughly impregnate the meerschaum with the platinum salt. The body thus treated is then burned in the flame of an ordinary Bunsen burner at a red heat to thoroughly oxidize the body and drive off all volatile elements, after which it is cleaned in some dilute organic acid, such as tartaric or ascetic acid. It is then placed in a platinum or palladium tube, with a cork of the same metal in the top, and is then burned in a blowpipe for about ten minutes, whereby it is raised to a very high temperature and the salts of the metal are scattered in every direction throughout the meerschaum and the body rendered incombustible. The body thus treated is then formed to suitable shape, preferably as a rectangular block 1, as shown in the drawing, and provided with grooves or depressions 2 on its upper surface. The body as thus treated, however, does not possess the requisite catalytic properties to ignite the gas; but it is necessary to bring in contact therewith metallic platinum or palladium, preferably in the form of very fine wires. This is best done by mounting the block 1 in the spring-arms 3 and securing to said arms below the body 1 the cross-bar 4, provided with notches 5 at its ends, on the lower side thereof. Fine platinum or palladium wires 6 are placed in the grooves of the body 1 and have their ends secured in the notches 5 of the cross-bar 4. The spring-arms 2 are secured to a bracket 7, which is adapted to be secured to the gas-burner or pilot-tube thereof; but this feature is not claimed herein, as it is claimed in an application of even date herewith, Serial No. 29,144.

Instead of using meerschaum any of the other well-known porous bodies may be used; but these must be first thoroughly impregnated with silicic acid and a solution of a salt of magnesium, after which they must be washed and treated in the manner above specified.

It has been found that a gas-igniting body when formed according to the foregoing process is exceedingly reliable and is very rapid in its action, igniting the gas almost instantaneously.

What I claim, and desire to secure by Letters Patent, is—

1. The method of making self-igniting bodies which consists in treating a porous body with silicic acid, saturating it in platinum hydrogen chlorid, then exposing it to a current of natural gas, and lastly heating it to a very high temperature.

2. The method of making self-igniting bodies which consists in treating meerschaum with silicic acid, then immersing it in a solution of platinum salts, and lastly heating it to a very high temperature.

3. The method of making self-igniting bodies which consists in treating a porous body with silicic acid, then saturating it with platinum hydrogen chlorid, then heating it to a very high temperature, and lastly assembling the same with metal of the platinum group in contact with the porous body.

4. A self-igniting body comprising an oxidized body of meerschaum impregnated with silicic acid and hydrogen platinum chlorid, and metal of the platinum group held in contact with said body.

In testimony whereof I, the said GUSTAV ADOLF W. BARKOWSKY, have hereunto set my hand.

G. ADOLF W. BARKOWSKY.

Witnesses:
F. W. WINTER,
MAY MAGEE.